United States Patent
Ishii

(10) Patent No.: US 11,958,019 B2
(45) Date of Patent: Apr. 16, 2024

(54) WATER TREATMENT CHEMICAL FOR MEMBRANES AND MEMBRANE TREATMENT METHOD

(71) Applicant: KURITA WATER INDUSTRIES LTD., Tokyo (JP)

(72) Inventor: Kazuki Ishii, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 543 days.

(21) Appl. No.: 17/281,975

(22) PCT Filed: Sep. 30, 2019

(86) PCT No.: PCT/JP2019/038493
§ 371 (c)(1),
(2) Date: Mar. 31, 2021

(87) PCT Pub. No.: WO2020/071309
PCT Pub. Date: Apr. 9, 2020

(65) Prior Publication Data
US 2021/0339205 A1    Nov. 4, 2021

(30) Foreign Application Priority Data

Oct. 5, 2018  (JP) ................... 2018-190257

(51) Int. Cl.
*B01D 65/08*  (2006.01)
*B01D 61/10*  (2006.01)
*C02F 1/44*  (2023.01)

(52) U.S. Cl.
CPC ............. *B01D 65/08* (2013.01); *B01D 61/10* (2013.01); *C02F 1/441* (2013.01);
(Continued)

(58) Field of Classification Search
None
See application file for complete search history.

(56) References Cited

U.S. PATENT DOCUMENTS

2020/0338240 A1\* 10/2020 Kaner .................. C08J 3/245

FOREIGN PATENT DOCUMENTS

| CN | 106029580 | 10/2016 |
|---|---|---|
| CN | 107735365 | 2/2018 |

(Continued)

OTHER PUBLICATIONS

"International Search Report (Form PCT/ISA/210) of PCT/JP2019/038493," dated Dec. 3, 2019, with English translation thereof, pp. 1-4.
(Continued)

*Primary Examiner* — Richard C Gurtowski
(74) *Attorney, Agent, or Firm* — JCIPRNET

(57) ABSTRACT

A water treatment chemical for membranes, which contains a polymer compound having a carboxyl group and a sulfo group, preferably a polymer compound represented by formula (1). A membrane treatment method wherein this water treatment chemical for membranes is added to membrane feed water when water to be treated, which contains an organic compound having a phenolic hydroxy group, is subjected to a membrane separation treatment.

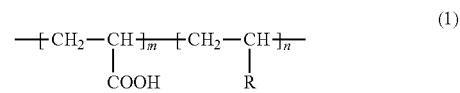

(1)

In the formula, m and n represent molar percentages of respective structural units; (m+n) is 90-100%; and R represents an anionic group containing a sulfo group.

4 Claims, 1 Drawing Sheet

(52) U.S. Cl.
CPC .. *B01D 2321/167* (2022.08); *B01D 2321/168* (2013.01); *C02F 2303/20* (2013.01)

(56) References Cited

FOREIGN PATENT DOCUMENTS

| | | |
|---|---|---|
| JP | 2011056496 | 3/2011 |
| JP | 2012206044 | 10/2012 |
| JP | 2015174030 | 10/2015 |
| JP | 2015174082 | 10/2015 |
| JP | 2015217353 | 12/2015 |
| JP | 5867532 | 2/2016 |
| JP | 2016187788 | 11/2016 |
| WO | 2018168522 | 9/2018 |

OTHER PUBLICATIONS

"Search Report of Europe Counterpart Application", dated May 27, 2022, p. 1-p. 10.
"Office Action of China Counterpart Application" with English translation thereof, dated Dec. 6, 2021, p. 1-p. 10.
"Office Action of China Counterpart Application" with English translation thereof, dated May 6, 2022, p. 1-p. 11.
"Office Action of Taiwan Counterpart Application" with English translation thereof, dated Aug. 26, 2022, p. 1-p. 13.
Giovanni Visco et al., "Organic carbons and TOC in waters: an overview of the international norm for its measurements", Microchemical Journal, Jan. 2005, pp. 1-7., vol. 79, Issues 1-2.
"Office Action of Europe Counterpart Application", dated May 23, 2023, p. 1-p. 11.

* cited by examiner

WATER TREATMENT CHEMICAL FOR MEMBRANES AND MEMBRANE TREATMENT METHOD

CROSS-REFERENCE TO RELATED APPLICATION

This application is a 371 application of an international PCT application serial no. PCT/JP2019/038493, filed on Sep. 30, 2019, which claims the priority benefit of Japan application 2018-190257, filed on Oct. 5, 2018. The entirety of each of the above-mentioned patent applications is hereby incorporated by reference herein and made a part of this specification.

BACKGROUND

Technical Field

The present invention relates to a water treatment chemical for membranes that prevents membrane contamination caused by an organic compound and relates to a membrane treatment method using the water treatment chemical for membranes.

Related Art

Water saving measures have been taken by desalinating seawater and salt water or by using a RO membrane system in a wastewater recovery system to improve the water recovery rate. When the RO membrane system is operated with a high recovery rate, the components of RO membrane feed water are highly concentrated on a RO membrane surface. Consequently, scale troubles and a blockage of the RO membrane caused by an organic compound occur.

Polyphenol, which is an organic compound having a phenolic hydroxy group, exists as a humic substance contained in soil, and is also used as a raw material for foods and beverages in food and beverage manufacturing factories and the like.

Therefore, because surface water and groundwater containing the humic substance and wastewater from the food and beverage manufacturing factories contain the organic compound having a phenolic hydroxy group, such as polyphenol and the like, if the above water is used as water to be treated to perform a RO membrane treatment, the blockage of the RO membrane caused by the organic compound having a phenolic hydroxy group in the RO membrane feed water becomes a problem.

Not limited to the RO membrane, even when the water to be treated containing polyphenol derived from food or beverage raw materials is treated with a separation membrane such as a microfiltration membrane, the polyphenol may be trapped by the filtration membrane, and the problem of membrane blockage may occur.

As described above, the humic substance contained in soil or the organic compound having a phenolic hydroxy group, such as the polyphenol used as a raw material for foods or beverages, causes membrane contamination (fouling) on separation membranes such as a microfiltration membrane (MF membrane), an ultrafiltration membrane (UF membrane), a nanofiltration membrane (NF membrane), a reverse osmosis membrane (RO membrane), and the like. The fouling is a phenomenon in which substances to be separated and the like existing in the membrane feed water adhere to and deposit on the membrane surface or membrane pores.

The fouling includes: layer formation by deposition of suspended particles on the membrane surface and adsorption of suspended particles to the membrane; gelation of soluble polymeric substances on the membrane surface; pore blocking (clogging) caused by adsorption, precipitation, blockage and air bubbles inside the membrane pores; flow passage blockage in a module; and the like.

The organic compound having a phenolic hydroxy group can also be removed by performing a flocculation adsorption treatment in a stage prior to a membrane separation treatment. However, the flocculation treatment has a low effect of removing an organic compound having a relatively low molecular weight such as fulvic acid and the like. Further, in the adsorption treatment, it is necessary to replace the adsorbent regularly.

Therefore, instead of this pretreatment, a water treatment chemical that is added to the membrane feed water to prevent membrane contamination caused by the organic compound having a phenolic hydroxy group such as polyphenol is desired.

Patent literature 1 has proposed a water treatment method in which a flocculation treatment process of adding a flocculant comprising an alkaline solution of a phenol resin having a melting point of 130 to 220° C. to the water to be treated is performed in a stage prior to a membrane separation treatment process. However, the phenol resin, which is an organic compound having a phenolic hydroxy group, may remain in flocculation treated water obtained by the flocculation treatment with the flocculant. Therefore, when the flocculation treated water is subjected to the membrane separation treatment, the membrane contamination caused by the organic compound having a phenolic hydroxy group may occur.

As a water treatment chemical for membranes, many chemicals have been proposed which deal with scale troubles caused by scale components such as calcium carbonate, calcium sulfate and the like in the water to be treated. However, few proposals have been made for the water treatment chemical for preventing the membrane contamination caused by the organic compound having a phenolic hydroxy group.

Patent literature 2 has proposed a dispersant for the organic compound having a phenolic hydroxy group, and the active component of the dispersant is a polymer compound containing a carbonyl group and having a structure in which a carbonyl carbon and a nitrogen atom are bonded, such as polyvinylpyrrolidone and polyacrylamide. However, in order to increase the degree of freedom in chemical selection and expands the diversity for practical use, further development of new chemicals is desired.

In addition, as described in patent literature 3, an AA/AMPS copolymer and an AA/HAPS copolymer used in the present invention are known as water-based calcium scale inhibitors. However, the effect of preventing the membrane contamination caused by the organic compound having a phenolic hydroxy group is not known.

LITERATURE OF RELATED ART

Patent Literature

Patent literature 1: Japanese Patent Laid-open No. 2011-56496
Patent literature 2: Japanese Patent No. 5867532

Patent literature 3: Japanese Patent Laid-open No. 2012-206044

SUMMARY

Problems to be Solved

The present invention aims to provide a water treatment chemical for membranes capable of effectively preventing membrane contamination caused by an organic compound having a phenolic hydroxy group in water to be treated when the water to be treated, which contains the organic compound having a phenolic hydroxy group, is subjected to a membrane separation treatment with a RO membrane or the like, and provide a membrane treatment method using the water treatment chemical for membranes.

Means to Solve Problems

As a result of repeated studies to solve the above problems, the present inventor has found that a polymer compound having a carboxyl group and a sulfo group can effectively disperse an organic compound having a phenolic hydroxy group in water to be treated, and can effectively prevent membrane contamination caused by the organic compound having a phenolic hydroxy group.
That is, the gist of the present invention is as follows.

[1] A water treatment chemical for membranes, which is a water treatment chemical for preventing membrane contamination caused by an organic compound having a phenolic hydroxy group, wherein the water treatment chemical contains a polymer compound having a carboxyl group and a sulfo group.

[2] The water treatment chemical for membranes according to [1], wherein the polymer compound is a polymer compound represented by the following Formula (1).

[Chemical formula 1]

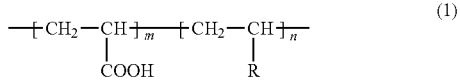
(1)

In Formula (1), m and n represent molar % of each structural unit, m+n=90 to 100%, and R represents an anionic group containing a sulfo group.

[3] The water treatment chemical for membranes according to [2], wherein R in Formula (1) is —C(=O)—NH—C(CH$_3$)$_2$—CH$_2$SO$_3$H and/or —CH$_2$OCH$_2$—CH(—OH)—CH$_2$SO$_3$H.

[4] The water treatment chemical for membranes according to [2] or [3], wherein n in Formula (1) is 5 to 50%.

[5] The water treatment chemical for membranes according to any one of [1] to [4], wherein the polymer compound has a mass-average molecular weight of 1000 to 30000.

[6] The water treatment chemical for membranes according to any one of [1] to [5], which is a water treatment chemical for reverse osmosis membranes that performs reverse osmosis membrane treatment on water to be treated which contains the organic compound having a phenolic hydroxy group, wherein concentrated water obtained by the reverse osmosis membrane treatment satisfies the following condition (A) and/or (B), and the following condition (C):

(A) as for filtered water obtained by filtering the concentrated water with a filter having a hole diameter of 0.45 μm, absorbance at a wavelength of 260 nm measured in a cell of 50 mm (abs (50 mm cell)) by using an ultraviolet visible light spectrophotometer is 0.01 to 5.0;

(B) the concentration of total organic carbon (TOC) or non-purgeable organic carbon (NPOC) in the concentrated water is 0.01 to 100 mg/L;

(C) the concentration of polyvalent metal cation in the concentrated water is 1 mg/L or more.

[7] The water treatment chemical for membranes according to [6], wherein the concentration ratio in the reverse osmosis membrane treatment is three times or more.

[8] A membrane treatment method, in which the water treatment chemical for membranes according to any one of [1] to [7] is added to membrane feed water when water to be treated which contains an organic compound having a phenolic hydroxy group is subjected to a membrane separation treatment.

[9] The membrane treatment method according to [8], wherein the water treatment chemical for membranes is added to the water to be treated so that the concentration of the polymer compound is 0.01 to 50 mg/L.

Effect

According to the present invention, when the water to be treated which contains the organic compound having a phenolic hydroxy group is subjected to the membrane separation treatment with the RO membrane or the like, the organic compound having a phenolic hydroxy group in the water to be treated can be effectively dispersed, the membrane contamination and the membrane blockage caused by the organic compound having a phenolic hydroxy group can be prevented, the decrease in the permeating water amount of the membrane is suppressed, and a stable and efficient membrane separation treatment can be performed for a long period of time.

DESCRIPTION OF THE EMBODIMENTS

Figure 1:
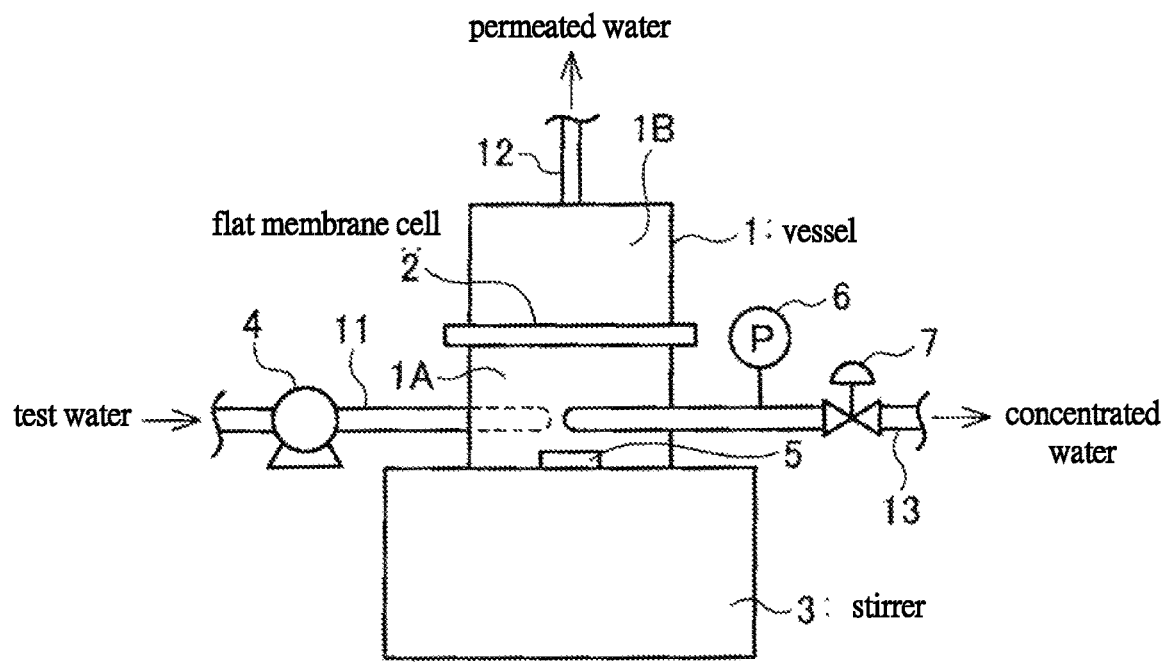
FIG. 1 is a schematic diagram showing a flat membrane test device used in an example.

Embodiments of the present invention are described below in detail.

Hereinafter, a case in which a water treatment chemical for membranes of the present invention is applied to a membrane separation treatment mainly using a RO membrane is illustrated to describe the present invention. However, the water treatment chemical for membranes of the present invention is also effectively applied to water to be treated (feed water) of a separation membrane such as a MF membrane, a UF membrane and a NF membrane or the like, not limited to the RO membrane.

The water treatment chemical for membranes of the present invention is a water treatment chemical for preventing membrane contamination caused by an organic compound having a phenolic hydroxy group, and contains a polymer compound, which has a carboxyl group (—COOH) and a sulfo group (—SO$_3$H), as an active component.

The present inventor has diligently studied water treatment chemicals capable of preventing a decrease in the permeating water amount in a RO membrane treatment system in which an organic compound having a phenolic hydroxy group such as a humic substance exists, and as a result, it has been found that the decrease in the permeating water amount can be suppressed by using a polymer compound having a carboxyl group and a sulfo group.

In particular, in a polymer compound represented by Formula (1) described later, a structural unit (b) described later is derived from 2-acrylamide-2-methylpropanesulfonic acid (AMPS) or 3-allyloxy-2-hydroxypropanesulfonic acid (HAPS), and it has been found that the higher the content of the structural unit (b), the less the degree of membrane contamination tends to be.

The mechanism by which this operational effect is obtained by the polymer compound having a carboxyl group and a sulfo group used in the present invention is presumed as follows.

That is, as a cause of membrane blockage due to the organic compound having a phenolic hydroxy group and a carboxyl group such as the humic substance and the like, the fact can be listed that the carboxyl group contained in the organic compound having a phenolic hydroxy group and a carboxyl group and a polyvalent metal cation such as calcium ion coexisting in water are bonded and crosslinked to be polymerized, and the polymerized organic compound adheres to the membrane surface.

It is considered that by using the polymer compound having a carboxyl group and a sulfo group, particularly the polymer compound represented by Formula (1), the carboxyl group contained in the polymer compound preferentially bonds to the polyvalent metal cation such as calcium ion and the like, and on the other hand, the electrostatic repulsive force of the R group derived from AMPS or HAPS prevents adhesion to the membrane and suppresses membrane contamination and membrane blockage.

The polymer compound having a carboxyl group and a sulfo group, which serves as an active component of the water treatment chemical for membranes of the present invention, includes the polymer compound represented by the following Formula (1).

<Polymer Compound Represented by Formula (1)>

[Chemical formula 2]

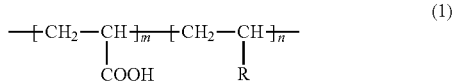

(1)

In Formula (1), m and n represent molar % of each structural unit, m+n=90 to 100%, and R represents an anionic group containing a sulfo group.

Hereinafter, in Formula (1), [$CH_2$—CH(—COOH)] may be referred to as "structural unit (a)", and [$CH_2$—CH(—R)] may be referred to as "structural unit (b)".

As the R in the above Formula (1), —C(=O)—NH—C$(CH_3)_2$—$CH_2SO_3H$ and —$CH_2OCH_2$—CH(—OH)—$CH_2SO_3H$ are preferable.

A structural unit (b) in which the R is —C(=O)—NH—C$(CH_3)_2$—$CH_2SO_3H$ can be introduced into the polymer compound by using 2-acrylamide-2-methylpropanesulfonic acid (AMPS) as a monomer raw material. Further, a structural unit (b) in which the R is —$CH_2OCH_2$—CH(—OH)—$CH_2SO_3H$ can be introduced into the polymer compound by using 3-allyloxy-2-hydroxypropanesulfonic acid (HAPS) as a monomer raw material.

The structural unit (a) can be introduced into the polymer compound by using acrylic acid (AA) as a monomer raw material.

The polymer compound represented by the above Formula (1) may contain a structural unit other than the structural unit (a) and the structural unit (b) in a range of 10 mol % or less. The other structural unit may be a structural unit capable of being introduced into the polymer compound represented by Formula (1) by a monomer raw material copolymerizable with the monomer raw material of the structural unit (a) and the monomer raw material of the structural unit (b), and is not particularly limited. For example, acrylamide, N-tert-butylacrylamide, diallylamine hydrochloride and the like can be used when AA and AMPS are used as the structural unit (a) and the structural unit (b) respectively.

Further, the polymer compound represented by the above Formula (1) may be phosphinopolycarboxylic acid which is a reaction product of a hypophosphorous acid, the structural unit (a) and the structural unit (b). As the phosphinopolycarboxylic acid, for example, Belclene (registered trademark) 400 manufactured by BWA can be preferably used when AA and AMPS are used as the structural unit (a) and the structural unit (b) respectively.

In Formula (1), m is a number representing molar % of the structural unit (a) and n is a number representing molar % of the structural unit (b) (wherein, m+n=90 to 100 mol %). From the viewpoint of exerting the crosslink suppressing effect of the carboxyl group and the electrostatic repulsion effect of the sulfo group in a well-balanced manner to effectively prevent membrane contamination, it is preferable that n is 5 to 50 mol % and m is 95 to 50 mol %, and particularly preferably n is 10 to 40 mol % and m is 90 to 60 mol %.

In addition, the carboxyl group and the sulfo group of the polymer compound represented by Formula (1) may form a salt such as a sodium salt, or may be in an ionic form such as COO$^-$.

The weight-average molecular weight of the polymer compound having a carboxyl group and a sulfo group used in the present invention is preferably 1000 to 30000, more preferably 2000 to 3000, and particularly preferably 8000 to 15000. When the molecular weight of the polymer compound is within the above ranges, the polymer compound has an excellent effect on dispersing contaminants such as the organic compound having a phenolic hydroxy group. In addition, here, the weight-average molecular weight of the polymer compound is a value measured by gel permeation chromatography analysis using polyacrylic acid as the standard substance.

The polymer compound having a carboxyl group and a sulfo group may be used alone or be used in combination of two or more.

Further, as long as the above polymer compound having a carboxyl group and a sulfo group is contained, the water treatment chemical for membranes of the present invention may contain a scale inhibitor and a slime control agent other than the polymer compound having a carboxyl group and a sulfo group.

The organic compound having a phenolic hydroxy group contained in membrane feed water to which the water treatment chemical of the present invention is applied include the following compounds.

The "phenolic hydroxy group" is a hydroxy group bonded to an aromatic ring, and examples of the organic compound having the phenolic hydroxy group include, for example, humic acid, fulvic acid, ellagic acid, phenolic acid, tannin, catechin, rutin, anthocyanin, and synthesized phenol resin.

The molecular weight (in the case of low molecule) or the weight-average molecular weight (in the case of polymer) of the organic compound having a phenolic hydroxy group is usually 500 to 1000000, preferably 1000 to 500000, and more preferably 1000 to 100000. If the molecular weight or the weight-average molecular weight of the organic compound having a phenolic hydroxy group is about 500 to 1000000 (preferably 1000 to 100000), the organic compound having a phenolic hydroxy group can be efficiently dispersed by the water treatment chemical for membranes of the present invention.

In addition, when the organic compound having a phenolic hydroxy group is a polymer such as polyphenol and the like, the weight-average molecular weight of the organic compound having a phenolic hydroxy group is a pullulan-equivalent value measured by the GPC method and calculated using a calibration curve by standard pullulan.

The water to be treated containing the organic compound having a phenolic hydroxy group include surface water and groundwater that contains a humic substance containing polyphenol, wastewater from food and beverage manufacturing factories containing polyphenol derived from raw materials, and the like. Further, flocculation treated water with remaining phenol resin described in the aforementioned patent literature 1 can also be listed as suitable water to be treated, wherein the flocculation treated water is obtained by being subjected to a flocculation treatment using an alkaline solution of a phenol resin as a flocculant.

The concentration of the organic compound having a phenolic hydroxy group contained in the water to be treated varies depending on the type of the water to be treated, and is usually about 0.01 to 10 mg/L.

The pH of the water to be treated supplied for a membrane treatment is not particularly limited, and is preferably 3.5 to 8.5, more preferably 4.0 to 7.5, and particularly preferably 5.0 to 7.0. Therefore, it is desirable to add an acid agent and/or an alkaline agent to adjust the pH of the water to be treated to the above pH range, if necessary.

The water treatment chemical for membranes of the present invention can be suitably used as, for example, a water treatment chemical for RO membranes. In particular, in a RO membrane separation treatment in which the obtained concentrated water satisfies the following condition (A) and/or (B), and the following condition (C), or in a RO membrane separation treatment in which the concentration ratio is three times or more, for example, three to five times, a good effect can be obtained by adding the water treatment chemical for membranes of the present invention to RO membrane feed water which contains the organic compound having a phenolic hydroxy group.

(A) As for filtered water obtained by filtering the concentrated water with a filter having a hole diameter of 0.45 μm, absorbance at a wavelength of 260 nm measured in a cell of 50 mm (abs (50 mm cell)) by using an ultraviolet visible light spectrophotometer is 0.01 to 5.0, particularly 0.1 to 1.0.

(B) The concentration of total organic carbon (TOC) or non-purgeable organic carbon (NPOC) in the concentrated water is 0.01 to 100 mg/L, particularly 1 to 10 mg/L. Here, TOC and NPOC can be measured by a combustion type oxidizing method or the like.

(C) The concentration of polyvalent metal cation in the concentrated water is 1 mg/L or more, particularly 10 to 100 mg/L.

When the water treatment chemical for membranes of the present invention is added to the RO membrane and other membrane feed water in order to prevent membrane contamination caused by the organic compound having a phenolic hydroxy group, the addition amount of the water treatment chemical for membranes of the present invention is preferably set to 0.01 to 50 mg/L, particularly 1 to 20 mg/L, in form of the concentration of the polymer compound having a carboxyl group and a sulfo group. If the addition amount of the polymer compound is too small, the dispersion effect of the organic compound having a phenolic hydroxy group due to the addition of the polymer compound cannot be sufficiently obtained, and if the addition amount of the polymer compound is too large, the polymer compound may cause membrane contamination.

EXAMPLE

Hereinafter, effects of the present invention are described in more detail with reference to specific examples. In addition, the present invention is not limited to the following examples.

Evaluation agents used in the following examples are shown in table 1 below.

TABLE 1

| | Structure of polymer compound (numerical value is molar %) | Weight-average molecular weight |
|---|---|---|
| Example 1 | AA/AMPS = 79:21 | 11000 |
| Example 2 | AA/HAPS = 82:18 | 11000 |
| Example 3 | AA/AMPS = 80:20 | 2200 |
| Example 4 | AA/AMPS = 92:8 | 2000 |
| Example 5 | AA/AMPS = 92:8 | 10000 |

Test methods in examples, reference examples and comparison examples are as follows.

<Preparation of Test Solution>

An aqueous solution (using pure water as base) containing a Canadian fluvo solution (UV260 value is adjusted to 0.8) as the organic compound having a phenolic hydroxy group, calcium chloride of 100 mg/L, and an evaluation agent of 1 mg/L (as an active component) was prepared, furthermore, the pH value of the aqueous solution was adjusted to 6.5 to 6.6 with a small amount of sodium hydroxide aqueous solution or sulfuric acid aqueous solution to prepare Test solution I.

Canadian fluvo is an organic compound having a phenolic hydroxy group having a molecular weight of 10000, and the concentration of the organic compound having a phenolic hydroxy group in Test solution I is about 2.2 mg/L.

Separately, Test solution II was prepared in the same manner as Test solution I except that Canadian fluvo and the evaluation agent were not added (Reference example 1).

In addition, Test solution III was prepared in the same manner as Test solution I except that the calcium chloride and the evaluation agent were not added (Reference example 2).

Furthermore, Test solution IV was prepared in the same manner as Test solution I except that the evaluation agent was not added (Comparison example 1).

<Test Device>

The flat membrane test device shown in FIG. 1 was used as a test device.

In the flat membrane test device, a flat membrane cell 2 is arranged at an intermediate position in the height direction of a cylindrical vessel 1 having an upper lid and a bottom lid to divided the inside of the vessel into a raw water chamber 1A and a permeated water chamber 1B, the vessel 1 is arranged on a stirrer 3, water to be treated is supplied to the raw water chamber 1A via a pipe 11 by a pump 4, a stirring piece 5 in the vessel 1 is rotated to stir the inside of the raw water chamber 1A, permeated water is taken out from the permeated water chamber 1B via a pipe 12, and concentrated water is taken out from the raw water chamber 1A via a pipe 13. A pressure gauge 6 and a pressure adjusting valve 7 are arranged in the concentrated water take-out pipe 13.

<RO Membrane Water Flow Test>

A RO membrane water flow test was performed under the following conditions by using the above Test solutions I to IV and the above test device.
RO membrane: polyamide RO membrane ("ES20" manufactured by Nitto Denko Corporation) Temperature: 24 to 25° C.
RO membrane recovery rate: 75% (4 times concentrated)
The water quality of the concentrated water obtained in the water flow tests of Test solutions I to IV is as shown in table 2 below.

TABLE 2

|  | Water quality of concentrated water | | | |
| --- | --- | --- | --- | --- |
|  | UV260 | TOC (mg/L) | NPOC (mg/L) | Ca (mg/L) |
| Test solution I | 3.3 | 9.0 | 9.0 | 400 |
| Test solution II | 0 | 0 | 0 | 400 |
| Test solution III | 3.2 | 8.8 | 8.8 | 0 |
| Test solution IV | 3.2 | 8.8 | 8.8 | 400 |

Figure 2:
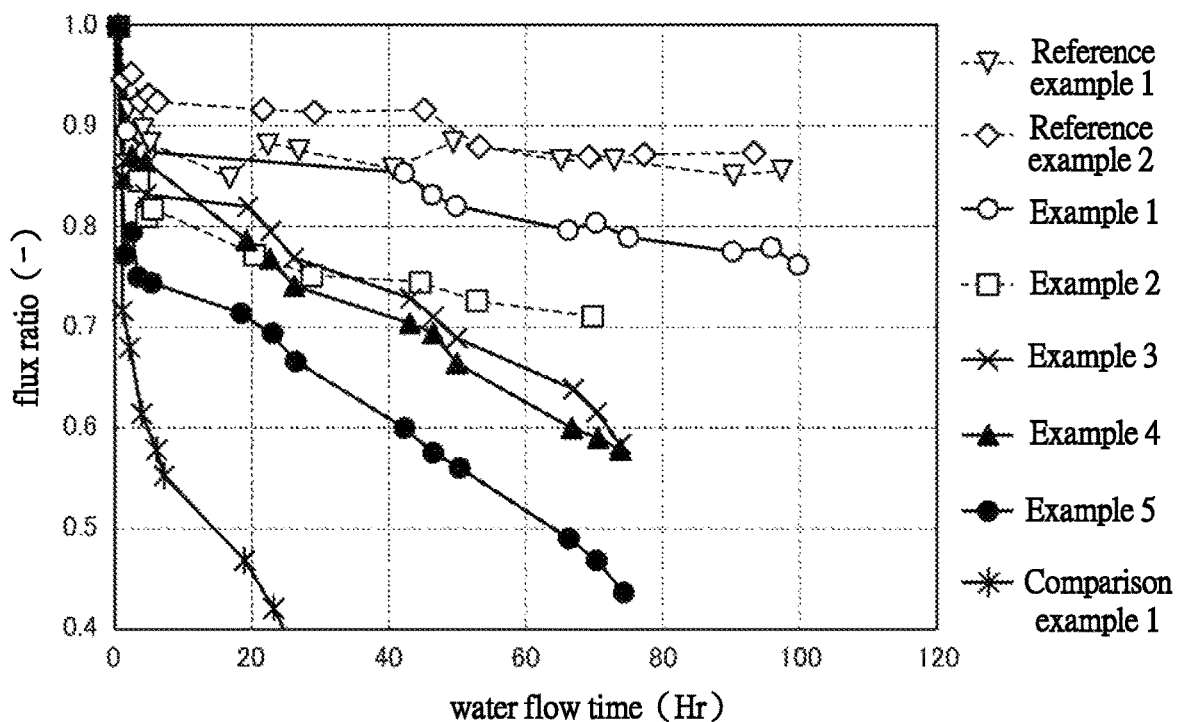
FIG. 2 is a graph showing results of Examples 1 to 5, Comparison example 1 and Reference examples 1 and 2.

The change over time in the flux ratio (ratio of flux after elapsed time with respect to initial flux) at this time was investigated, and results thereof are shown in FIG. 2.

As is clear from FIG. 2, in Comparison example 1 in which no agent was added, the flux ratio greatly decreases as time elapses; however, in Examples 1 to 5, the decrease in the flux ratio can be suppressed. Particularly, in Examples 1 and 2 in which a polymer compound that is an AA/AMPS or AA/HAPS copolymer containing the structural unit (a) and the structural unit (b) in Formula (1) in a suitable molar ratio and having a suitable molecular weight was used, 70% or more of the initial flux can be maintained for a long period of time even with continuous water flow.

On the other hand, in Test solution II containing Ca but not containing Canadian fluvo and Test solution III containing Canadian fluvo but not containing Ca, almost no decrease in the flux is observed. Therefore, it can be seen that the effect according to the present invention (effect of improving flux with respect to Comparison example 1 in which no agent is added) is a dispersion effect on the organic compound having a phenolic hydroxy group in the coexistence of polyvalent metal cation, and is an effect different from that of calcium scale inhibitor.

Although the present invention has been described in detail using specific embodiments, it is apparent to those skilled in the art that various modifications can be made without departing from the intent and scope of the invention.

This application is based on Japanese Patent Application 2018-190257 filed on Oct. 5, 2018, which is incorporated by reference in the entirety thereof.

REFERENCE SIGNS LIST 1 vessel
1A raw water chamber
1B permeated water chamber
2 flat membrane cell
3 stirrer

What is claimed is:

1. A water treatment chemical for membranes, wherein the water treatment chemical contains a polymer compound having a carboxyl group and a sulfo group,
the polymer compound is a polymer compound has a mass-average molecular weight of 8000 to 15000 represented by the following Formula (1),

[Chemical formula 1]

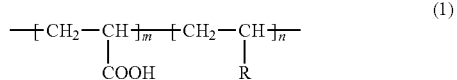

in Formula (1), m and n represent molar % of each structural unit, m+n=90 to 100%, n is 10 to 40%, and R is —C(=O)—NH—C(CH$_3$)$_2$—CH$_2$SO$_3$H and/or —CH$_2$OCH$_2$—CH(—OH)—CH$_2$SO$_3$H.

2. A membrane treatment method, in which the water treatment chemical for membranes according to claim 1 is added to membrane feed water when water to be treated which contains an organic compound having a phenolic hydroxy group is subjected to a membrane separation treatment.

3. The membrane treatment method according to claim 2, wherein the water treatment chemical for membranes is added to the water to be treated so that the concentration of the polymer compound is 0.01 to 50 mg/L.

4. The membrane treatment method according to claim 2, which the membrane separation treatment is a reverse osmosis membrane treatment, wherein concentrated water obtained by the reverse osmosis membrane treatment satisfies the following condition (A) and/or (B), and the following condition (C):

(A) as for filtered water obtained by filtering the concentrated water with a filter having a hole diameter of 0.45 μm, absorbance at a wavelength of 260 nm measured in a cell of 50 mm (abs (50 mm cell)) by using an ultraviolet visible light spectrophotometer is 0.01 to 5.0;
(B) the concentration of total organic carbon (TOC) or non-purgeable organic carbon (NPOC) in the concentrated water is 0.01 to 100 mg/L;
(C) the concentration of polyvalent metal cation in the concentrated water is 1 mg/L or more.

* * * * *